United States Patent [19]

Hardin

[11] 4,063,767
[45] Dec. 20, 1977

[54] WATER HOSE HOLDER TONGS

[75] Inventor: John Kelly Hardin, Walnut Springs, Tex.

[73] Assignee: The Raymond Lee Organization, Inc., New York, N.Y.

[21] Appl. No.: 740,082

[22] Filed: Nov. 9, 1976

[51] Int. Cl.² .............................................. B66C 1/62
[52] U.S. Cl. ...................................... 294/16; 248/75; 294/118
[58] Field of Search .................. 294/3, 11, 16, 28, 30, 294/106, 113, 117, 118, 119; 248/75, 76

[56] References Cited

U.S. PATENT DOCUMENTS

| 297,788 | 4/1884 | Green | 294/118 X |
|---|---|---|---|
| 596,689 | 1/1898 | Aungst | 248/75 |
| 1,484,100 | 2/1924 | Wertz | 294/119 |
| 2,507,368 | 5/1950 | Carlson | 294/16 |
| 2,597,760 | 5/1952 | Strahm | 294/16 |
| 2,919,071 | 12/1959 | Dalton | 248/75 X |

Primary Examiner—Johnny D. Cherry
Attorney, Agent, or Firm—Howard I. Podell

[57] ABSTRACT

A tool for holding a flexible water hose which is shaped as a pair of hinged tongs, with each tong formed with a handle section at one end and a set of two clamp jaws at the other end of the tong.

2 Claims, 3 Drawing Figures

WATER HOSE HOLDER TONGS

SUMMARY OF THE INVENTION

My invention is a tool for holding a flexible water hose which is shaped as a pair of hinged tongs, with each tong formed with a handle section at one end and a set of two clamp jaws at the other end of the tong.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
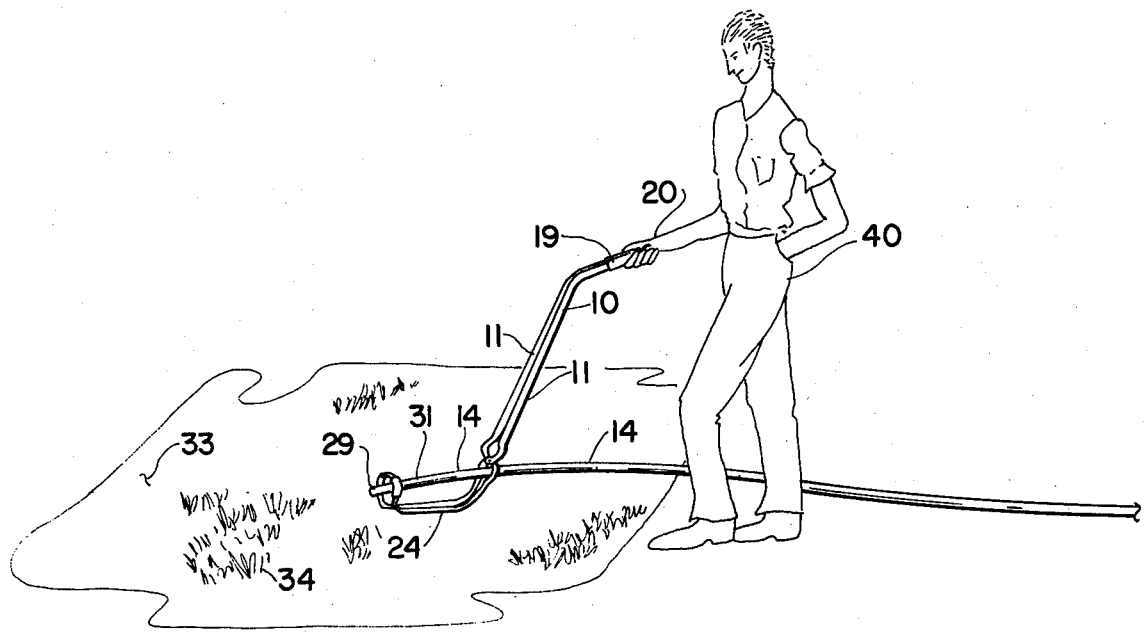
FIG. 1 is a perspective view of the invention in use.
Figure 2:
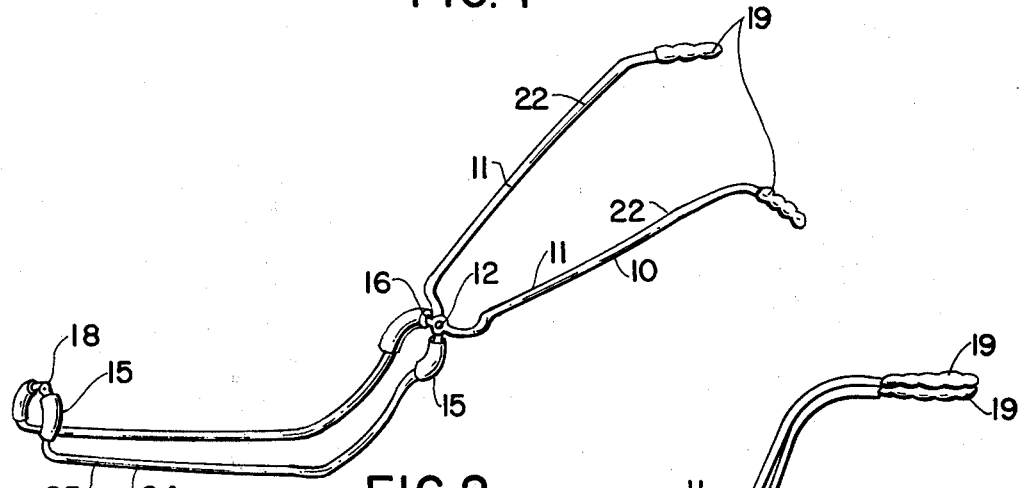
FIG. 2 is a perspective view of the invention.
Figure 3:
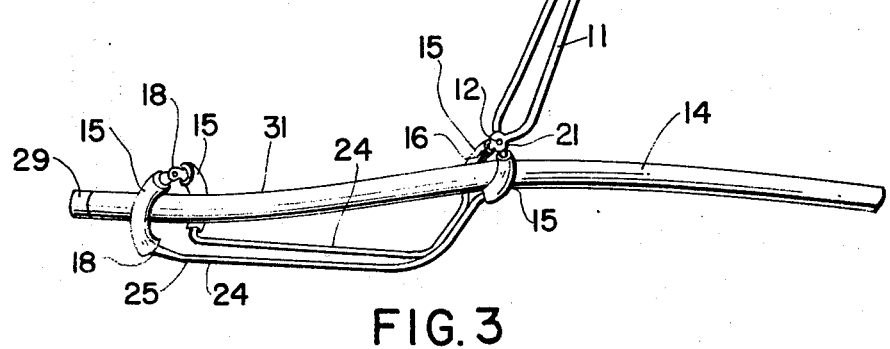
FIG. 3 is a perspective view of the invention in the closed position, mounted around a water hose.

Turning now descriptively to the drawings, in which similar reference characters denote similar elements throughout the several views, FIG. 1-3 illustrate the assembly 10 in the form of a pair of shaped tongs 11, pivotably mounted together at their mid-section 21 by a rivet 12, with a handle section 22 extending on each tong from rivet 12 and fitted on the handle end with a hand grip cup 19 so that both cups 19 may be gripped together by one hand 20 of a user when the opposed leg sections 24 are gripped about a length of garden hose 14.

Each leg section 24 is shaped with a first semi-circular clamp section 16 enclosed by a flexible tube 15, adjacent to rivet pin 21 and a second similar clamp section 18 located at the end section 25 of the leg section 24, with both clamp sections 16 and 18 of a size to grip approximately one-half the periphery of a straight garden hose section 31 that extends between pairs of gripped clamp sections 16 and 18 as shown in FIGS. 1 and 3, so that the open end 29 of hose 14 extends beyond second clamp sections 18 to permit the user 40 to extend hose 14 along the ground 33 along the base of shrubs or garden plants 34 while the user 40 stands at a distance from the plants 34.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A tool for detachably holding a flexible water hose comprising two shaped tongs pivotally joined together at a pivot point with a handle section and a leg section of each tong extending in opposed directions from the said pivot point, with each leg section shaped as a first semi-circular clamp section generally located adjacent the said pivot point, and shaped as a second semi-circular clamp section generally located at a spaced distance from said first clamp section and at a greater spaced distance, in the direction away from which the handle section extends, from said pivot point than the said first clamp section, said clamp sections shaped to grip the periphery of a generally straight tubular water hose extending between said clamp sections, with the leg sections of both tongs of similar size and each generally shaped as a mirror image of the other, with each handle section formed with a grip section at its free end and shaped so that the grip sections of both handle sections abut each other when the clamp sections of the tongs are fitted about a tubular water hose of a given size so that both grip sections may be held by one hand of the user when the clamp sections are gripped about a hose of the given size.

2. The tool as described in claim 1 in which a flexible tube is fitted about each clamp section of each tong.

* * * * *